United States Patent
Poojary et al.

(10) Patent No.: US 9,131,519 B2
(45) Date of Patent: Sep. 8, 2015

(54) COMMUNICATIONS COEXISTENCE SIGNALING

(71) Applicant: Broadcom Corporation, Irvine, CA (US)

(72) Inventors: Neeraj Poojary, Santa Clara, CA (US); Prasanna Desai, Elfin Forest, CA (US); Sudhir Prajapati, Bangalore (IN); Sachin Gupta, Bangalore (IN); Pawan Kumar, Bangalore (IN); Gabriel Desjardins, San Francisco, CA (US); Sanjay Saha, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 239 days.

(21) Appl. No.: 13/761,605

(22) Filed: Feb. 7, 2013

(65) Prior Publication Data

US 2014/0177603 A1    Jun. 26, 2014

Related U.S. Application Data

(60) Provisional application No. 61/740,099, filed on Dec. 20, 2012.

(51) Int. Cl.
*H04J 3/16* (2006.01)
*H04W 72/12* (2009.01)
*H04W 88/06* (2009.01)

(52) U.S. Cl.
CPC ...... *H04W 72/1215* (2013.01); *H04W 72/1247* (2013.01); *H04W 88/06* (2013.01)

(58) Field of Classification Search
CPC ............ H04W 72/1215; H04W 72/1242; H04W 72/1247; H04W 88/06
USPC ......... 370/328, 329, 336, 337, 338, 345, 437, 370/447–448, 458, 461, 462, 465, 468, 498, 370/442–444
See application file for complete search history.

(56) References Cited

U.S. PATENT DOCUMENTS

| | | | |
|---|---|---|---|
| 7,813,275 B2 * | 10/2010 | Yamada et al. | 370/230 |
| 7,826,411 B2 * | 11/2010 | Gonikberg et al. | 370/328 |
| 8,139,531 B2 * | 3/2012 | Li et al. | 370/329 |
| 8,750,926 B2 * | 6/2014 | Fu et al. | 455/553.1 |
| 8,831,655 B2 * | 9/2014 | Burchill et al. | 455/501 |
| 2002/0163933 A1 * | 11/2002 | Benveniste | 370/465 |
| 2003/0033394 A1 * | 2/2003 | Stine | 709/222 |
| 2003/0101274 A1 * | 5/2003 | Yi et al. | 709/232 |
| 2005/0215284 A1 * | 9/2005 | Su et al. | 455/556.2 |
| 2007/0275746 A1 * | 11/2007 | Bitran | 455/509 |
| 2008/0279162 A1 * | 11/2008 | Desai | 370/338 |
| 2009/0016295 A1 * | 1/2009 | Li et al. | 370/330 |
| 2009/0019165 A1 * | 1/2009 | Li et al. | 709/227 |
| 2009/0285196 A1 * | 11/2009 | Lee et al. | 370/345 |
| 2012/0014471 A1 * | 1/2012 | Subramanian et al. | 375/285 |
| 2013/0272283 A1 * | 10/2013 | Jechoux et al. | 370/338 |
| 2014/0120969 A1 * | 5/2014 | Sang et al. | 455/501 |

* cited by examiner

*Primary Examiner* — Kevin Mew
(74) *Attorney, Agent, or Firm* — McDermott Will & Emery LLP

(57) ABSTRACT

A coexistence signaling scheme for radio communications is described. In one embodiment, a method for coexistence signaling includes establishing first communications and second communications with separate access points or base stations. The method further includes determining protocol timings of the first and second communications. Based on various communications parameters, protocol timings, and identified interference conditions, the method includes generating one or more priority signals to manage the first and second communications. According to certain aspects, overlapping channel conditions can be avoided while maintaining acceptable communications data throughput.

20 Claims, 10 Drawing Sheets

COMMUNICATIONS COEXISTENCE SIGNALING

CROSS-REFERENCE TO RELATED APPLICATIONS

This application claims the benefit of U.S. Provisional Application No. 61/740,099, filed Dec. 20, 2012, the entire contents of which is hereby incorporated herein by reference.

BACKGROUND

Many portable electronic devices, especially phone and tablet devices, include circuitry that facilitates communications according to various standards or specifications. For example, a telephone may communicate according to Advanced Mobile Phone ("AMPS"), digital AMPS, Global System for Mobile communications ("GSM"), Code Division Multiple Access ("CDMA"), Local Multi-point Distribution Systems ("LMDS"), Long Term Evolution ("LTE"), Multi-channel-Multi-point Distribution System (MMDS), or other cellular services, and/or variations thereof. The phone may further communicate according to Bluetooth ("BT") and Wireless Local Area Network ("WLAN") (e.g., 802.11-based) standards or services, among others. In certain circumstances, the operating frequency bands of cellular, BT, and WLAN communications standards can interfere with each other when used together, leading to communication and/or data loss.

BRIEF DESCRIPTION OF THE DRAWINGS

For a more complete understanding of the embodiments and the advantages thereof, reference is now made to the following description, in conjunction with the accompanying figures briefly described as follows.

Figure 1:
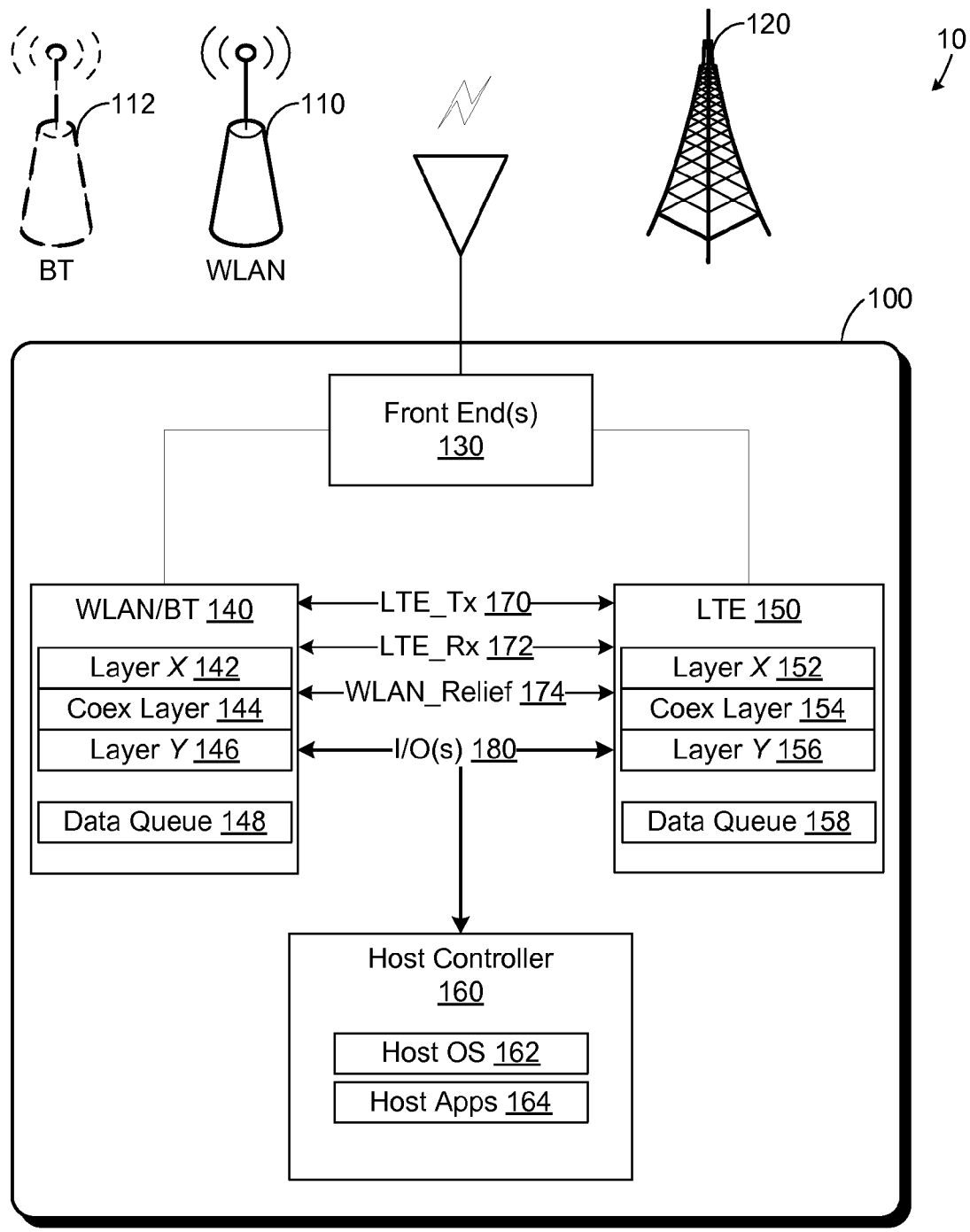
FIG. 1 illustrates a system for communications coexistence according to an example embodiment.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions or positions of elements and features may be exaggerated to help visually convey certain principles. In the drawings, similar reference numerals between figures designate like or corresponding, but not necessarily the same, elements.

DETAILED DESCRIPTION

In the following paragraphs, the embodiments are described in further detail by way of example with reference to the attached drawings. In the description, well known components, methods, and/or processing techniques are omitted or briefly described so as not to obscure the embodiments.

The embodiments described herein are not limited in application to the examples set forth in the following description. The invention is capable of other embodiments and of being practiced or carried out in various ways. Also, the phraseology and terminology used herein is for the purpose of description and should not be regarded as limiting. The use of "including," "comprising," "having," and variations thereof is meant to encompass the identified items, equivalents thereof, and other additional items. The terms "connected" and "coupled" are used broadly to encompass both direct and indirect connections and couplings and are not restricted to physical or mechanical connections or couplings.

Many portable electronic devices include communications circuitry that facilitates communications according to various communications standards or specifications. For example, a phone may include cellular, BT, and WLAN radio circuitry, among other circuitry. In certain circumstances, the operating frequency bands of cellular, BT, and WLAN communications standards interfere with each other when used together, leading to communication and/or data loss. In this context, techniques for mitigating interference are described herein.

It is noted that, by design, some communications standards are able to automatically mitigate for interference. For example, a BT transceiver can avoid radio interference with other standards by relying upon automatic frequency hopping. Also, at least for certain channels, cellular and WLAN frequencies are sufficiently separated to avoid interference. However, for some channel combinations of certain cellular and WLAN standards, band separation is not sufficient to completely avoid interference. For these cases, cellular band filtering may be relied upon to mitigate interference. In other situations, time-domain coexistence of the cellular and WLAN standards is preferable.

Sufficient separation between WLAN frequencies and the XGP band (i.e., 2545-2575 MHz) or band 38 (i.e., 2570-2620 MHz) of the LTE cellular standard may be achieved by using sharp cellular band filters, for example. In another case, separation between WLAN frequencies and band 7 (i.e., 2500-2570 MHz Tx; 2620-2690 MHz Rx) of the LTE standard using sharp cellular band filters may be sufficient for WLAN channels 1-11 (e.g., about 2400-2460 Mhz) but not for WLAN channels 12 and 13 (e.g., greater than about 2460 Mhz). Thus, for separation between LTE band 7 and WLAN channels 12 and 13, time domain separation may be preferable to other separation techniques. Further, even if operating frequencies of communications standards are not directly overlapping, intermodulation products of frequencies of one standard may fall upon frequencies of another standard.

It is noted that these examples of band (and band-intermodulation) interference among communications standards are provided by way of example only, as other bands of interference exist today and may arise in the future. In this context, it is noted that future configurations of cellular transceivers may rely upon frequency bands, such as bands in the 2300-2400 MHz range, that encroach upon the Industrial, Scientific, and Medical ("ISM") frequency bands relied upon by the WLAN standards.

In view of the discussion above, a coexistence signaling scheme is described herein to facilitate the operation of various cellular, BT, and WLAN transceivers in a single device. In general, the coexistence signaling scheme comprises a signaling protocol to help mitigate interference between circuitry operating according to different communications standards.

Turning now to the drawings, a description of exemplary embodiments of a system and its components are provided, followed by a discussion of the operation of the same.

FIG. 1 illustrates a system 10 for communications coexistence according to an example embodiment. The system 10 comprises a device 100, a WLAN access point 110, and a base station 120. In various embodiments, the access point 110 comprises an access point of a WLAN, such as an 802.11-based (e.g., "WiFi") or 802.16-based (e.g., "WiMax") wireless network, for example. The communications standard relied upon by the access point 110 is not limited to the 802.11- and 802.16-based standards. Instead, other communications standards are within the scope of the embodiments described herein. It is noted that the access point 110 may be representative of a WLAN comprising several network switches, routers, and access points, in any configuration. In some embodiments, the system 10 further comprises a BT access point 112. The access point 112 may comprise any BT accessory such as headphones, a headset, a controller, a keyboard, or a pointing device, for example.

The base station 120 comprises a station of a cellular-based wireless network. In an exemplary embodiment, the base station 120 comprises a station of an LTE communications network. In various embodiments, however, the base station 120 may comprise a station of any known cellular-based wireless network. As generally described herein, the access point 110 communicates according to a first communications specification, and the base station 120 communicates according to a second to communications specification. As discussed above, the first and second communications specifications may interfere with each other, leading to packet loss and/or disassociation with the access point 110 or the base station 120.

The device 100 comprises a front end 130, WLAN/BT circuitry 140, LTE circuitry 150, and a host controller 160. The front end 130 comprises RF front end circuitry that supports wireless communications between the device 100 and the access points 110 and 112 and the base station 120. For example, the front end 130 may comprise one or more antennas, mixers, and duplexers. The front end 130 may further comprise filtering circuitry (e.g., band pass, band stop, and cellular blocking filters) and amplifiers to support wireless communications. It is noted that, in various embodiments, the front end 130 may comprise elements respective to each of the communications standards supported by the device 100.

The host controller 160 executes a host OS 162 and host applications 164. In general, the host controller 160 coordinates the overall operations of the device 100, including the operations of the WLAN/BT 140 and the operations of the LTE 150. Further, although not shown, the host controller 160 may control or coordinate other elements of the device 100 such as a display, a speaker, a microphone, and a camera, for example. As described in further detail below, in one embodiment, the host controller 160 comprises an integrated processor chip having access to one or more memory devices. The host controller 160 is coupled to the WLAN/BT 140 and the LTE 150 via the I/O interface 180. Via the I/O interface 180, the host controller 160 communicates various data and signals to the WLAN/BT 140 and the LTE 150.

The WLAN/BT 140 comprises various application layers including layer X 142, a coexistence layer 144, and layer Y 146. The WLAN/BT 140 further comprises a data queue 148, as further described below. The layers 142, 144, and 146 comprise abstraction layers of a system model of the WLAN/BT 140. For example, the layers 142, 144, and 146 may be considered similar to layers of the Open Systems Interconnection ("OSI") model, such as session, transport, and network layers, for example. It is noted that the layers 142 and 146 support and communicate with the coexistence layer 144 and, in various embodiments, may provide session management, flow control, logical and/or physical addressing, or data transmission, among other functions. The layers 142 and 146 are provided by way of example only and are not to be considered limiting, as such layers may be omitted and other layers included in various embodiments.

In certain aspects, the coexistence layer 144 is similar to the transport layer of the OSI model, but operates to achieve communications coexistence with the LTE 150 according to a signaling scheme between the WLAN/BT 140 and the LTE 150. In one aspect, the coexistence layer 144 is configured to establish communications with the access point 110, identify a priority signal generated by the LTE 150, and manage communications with one or both of the access points 110 and 112 based on the priority signal. In other aspects, the coexistence layer 144 is configured to analyze a timing pattern of the priority signal, and manage communications with the access point 110 based on the timing pattern. Additionally, the coexistence layer 144 may be configured to generate a relief request signal based on a status of communications with one or both of the access points 110 and 112.

The LTE 150 comprises various application layers including layer X 152, a coexistence layer 154, and a layer Y 156. The LTE 150 further comprises a data queue 158, as further described below. The layers 152, 154, and 156 comprise abstraction layers of a system model of the LTE 150. Again, the layers 152, 154, and 156 may be considered similar to layers of the Open Systems Interconnection (OSI) model, such as session, transport, and network layers, for example. It is noted that the layers 152 and 156 support and communicate with the coexistence layer 154 and, in various embodiments, may provide session management, flow control, logical and/ or physical addressing, or data transmission, among other functions. The layers 152 and 156 are provided by way of example only and are not to be considered limiting, as such layers may be omitted and other layers included in various embodiments. It is noted that, in alternative embodiments, the data queues 148 and 158 may be implemented by memory devices separate from the WLAN/BT 140 and the LTE 150, or combined within the host controller 160.

The coexistence layer 154 is similar to the transport layer of the OSI model in certain aspects because it operates to achieve communications coexistence with the WLAN/BT 140 according to the signaling scheme between the WLAN/BT 140 and the LTE 150. In one aspect, the coexistence layer 154 is configured to establish communications with the base station 120, forecast data communications with the base station 120, and generate one or more priority signals based on the forecast. In other aspects, the coexistence layer 154 is configured to identify a relief request signal and manage communications with the base station 120 based on the relief request signal.

As described in further detail below, in one embodiment, both the WLAN/BT 140 and the LTE 150 comprise integrated processor chips comprising and/or having access to one or more memory devices. As one example, each comprises an Application Specific Integrated Circuit ("ASIC") adapted for communications according to one or more communications standards or specifications.

As illustrated in FIG. 1, the WLAN/BT 140 and the LTE 150 share the communications signals LTE_Tx 170, LTE_Rx 172, and WLAN_Relief 174. In exemplary embodiments, the LTE_Tx 170 and LTE_Rx 172 signals are generated by the LTE 150 and are provided to the WLAN/BT 140, and the WLAN_Relief 174 signal is generated by the WLAN/BT 140 and is provided to the LTE 150.

According to certain aspects described herein, the communications signals 170, 172, and 174 comprise signals of a coexistence signaling scheme. Communication of the signals 170, 172, and 174 between the WLAN/BT 140 and the LTE 150 may be facilitated by a direct connection between general purpose pins on the WLAN/BT 140 and general purpose pins on the LTE 150, for each of the signals 170, 172, and 174, although other means of coupling the signals between the WLAN/BT 140 and the LTE 150 are within the scope of the embodiments described herein.

As noted, the WLAN/BT 140 and the LTE 150 are configured to rely upon the signals LTE_Tx 170, LTE_Rx 172, and WLAN_Relief 174 as part of a coexistence signaling scheme. In that context, the WLAN/BT 140 and the LTE 150 may be configured to generate, identify, and act upon the LTE_Tx 170, LTE_Rx 172, and WLAN_Relief 174 signals. In general, the coexistence signaling scheme is relied upon by the device 100 to facilitate the coexistence of communications standards that may otherwise interfere with each other.

According to one embodiment, the LTE_Tx 170 signal indicates to the WLAN/BT 140 that a transmission by the LTE 150 is scheduled to occur within a certain predetermined time. After identifying an edge of the LTE_Tx 170 signal, the WLAN/BT 140 is configured to suspend its communications with the access point 110. By suspending its communications, the WLAN/BT 140 may prevent desensitization of its receiver caused by an LTE transmission, for example. The suspension of communications may involve the transmission of one or more 802.11-based protocol commands or messages from the WLAN/BT 140 to the access point 110. In one embodiment, the WLAN/BT 140 may suspend communications with the access point 110 by entering a power-save or power-management mode. In general, receiver desensitization occurs when a receiver is directly (or by intermodulation) frequency-overlapped by transmission frequencies of other communication circuit(s), effectively jamming the receiver.

As further discussed below with reference to FIG. 9, assertion of the LTE_Tx 170 signal by the LTE 150 may be based in part upon a coexistence matrix that identifies when certain intermodulation conditions are met between the WLAN/BT 140 and the LTE 150. The intermodulation conditions may depend upon which LTE channel is being relied upon for transmission (e.g., LTE band 7 vs. band 38), for example.

The LTE_Rx 172 signal indicates to the WLAN/BT 140 that a signal is scheduled to be received by the LTE 150 within a certain predetermined time. After identifying an edge of the LTE_Rx 172 signal, the WLAN/BT 140 is configured to reduce a transmission power of transmissions (or suspend transmissions) to the access point 110. In this manner, the WLAN/BT 140 can prevent or reduce intermodulation products, for example, from falling on a receiver of the LTE 150. As further discussed below, assertion of the LTE_Rx 172 by the LTE 150 may be based in part upon a coexistence matrix that identifies when certain intermodulation conditions are met between the WLAN/BT 140 and the LTE 150. The inter-modulation conditions may depend upon which WLAN channel is being relied upon for transmission (e.g., WLAN channel 6 vs. 11), for example.

In one embodiment, the WLAN_Relief 174 signal indicates a distress condition of the WLAN/BT 140 to the LTE 150. For example, if transmissions by the LTE 150 have been active with a high duty cycle for a significant period of time and WLAN throughput over this time period has been low, the data queue 148 of the WLAN/BT 140 may be full. Thus, the WLAN_Relief 174 signal may indicate that it is necessary for the WLAN/BT 140 to transfer data. In another case, for example, when transmitting a probe request message to discover surrounding WLAN access points, the WLAN_Relief 174 signal may be asserted to prevent the LTE 150 from transmitting over any Probe Response signals received from the surrounding WLAN access points in response to the probe request message. In this case, the WLAN_Relief 174 signal may be asserted for a predetermined period of time, such as 6 ms, for example, to prevent the LTE 150 from corrupting the reception of any Probe Request signals, as this may lead to a failure of access point discovery.

In other cases, a data queue of the access point 110 may be full. The data queue of the access point 110 may be full due to a power management mode of operation. In the power management mode, the WLAN/BT 140 indicates to the access point 110 that the WLAN/BT 140 is entering a "sleep" state for a certain period of time. During this sleep time, the access point 110 may buffer data in a data queue to be transmitted to the WLAN/BT 140 at a later time. At certain intervals, it is necessary for the WLAN/BT 140 to "wake" for the receipt of an Announcement Traffic Indication Message ("ATIM") beacon from the access point 110. Within the beacon, the access point 110 identifies whether data is buffered for communication to the WLAN/BT 140. If the WLAN/BT 140 does not acknowledge the ATIM beacon, for example, data stored in the access point 110 may be deleted or overwritten by the access point 110. This condition may result in a rate fallback adaptation by the access point 110. That is, the access point 110 may determine that the WLAN/BT 140 cannot facilitate communications at a certain data rate, and select a lower rate for communications. In other cases, the access point 110 may disassociate with the WLAN/BT 140. In view of these considerations, the WLAN/BT 140 may assert the WLAN_Relief 174 signal to indicate a distress condition to the LTE 150.

FIGS. 2-5 illustrate signal timings of the LTE_Tx 170, LTE_Rx 172, and WLAN_Relief 174 signals between the WLAN/BT 140 and LTE 150, according example embodiments. At the outset, it is noted that the signal timings are not necessarily drawn to scale. Further, logic levels different from those illustrated may be relied upon in various embodiments, as one would recognize that the level(s) used to represent certain logic states can be arbitrarily selected.

Figure 2:
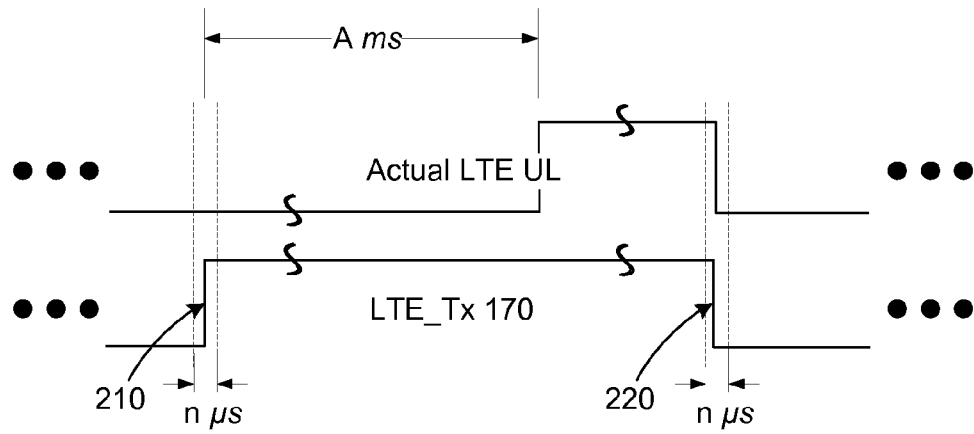
FIGS. 2-5 illustrate signal timings between system elements in the system of FIG. 1 according example embodiments.

Turning first to FIG. 2, example timings of the LTE_Tx 170 signal are illustrated. At edge 210, the LTE_Tx 170 signal transitions from a low to a high logic level. According to one embodiment, the transition from the low to high logic level is specified to occur "A" ms before an actual UL (i.e., transmission) by the LTE 150. In one embodiment, the period "A" is specified as 2 ms, although other periods are within the scope of the embodiments described herein. As illustrated, the actual LTE UL begins at some time at or after the period "A," and the LTE_Tx 170 signal remains at the logic high level until the edge 220, when the actual LTE UL concludes. According to certain aspects of the coexistence signaling scheme, a time period of "n" μs is attributed or expected for jitter between edges. According to other aspects, the LTE_Tx 170 signal is asserted only if the LTE 150 is scheduled to transmit data, and the LTE_Tx 170 signal shall remain at the logic high state if an LTE UL is scheduled in consecutive subframes.

Upon identification of the edge 210, the WLAN/BT 140 may perform certain tasks, update or adapt communications parameters, and suspend WLAN communications. The WLAN/BT 140 may transmit one or more 802.11-based protocol commands or messages from the WLAN/BT 140 to the access point 110 during the time period "A", with or without the transmission of data. For example, the WLAN/BT 140 may transmit data in connection with a CTS-to-Self announcement. According to certain WLAN protocol standards, the WLAN/BT 140 may specify a certain time period during which it plans to transmit data, using a CTS-to-Self announcement. By doing so, the WLAN/BT 140 may effectively squelch communications by other nodes in the WLAN network, in favor of itself.

At the conclusion of data transmission accompanied by a CTS-to-Self announcement (or without the announcement), the WLAN/BT 140 may exchange one or more WLAN media access control protocol messages for maintenance of communications between the WLAN/BT 140 and the access point 110. For example, the WLAN/BT 140 may indicate to the access point 110 that it is entering a power management sleep mode, according to power management protocol commands. Thus, it is noted that the WLAN/BT 140 may perform certain communication and housekeeping tasks within "A" ms of the edge 210, before suspending communications. It is noted that, in some embodiments, the "suspension" of communications may include the suspension of data transmission, data reception, or both data transmission and reception.

Figure 3:
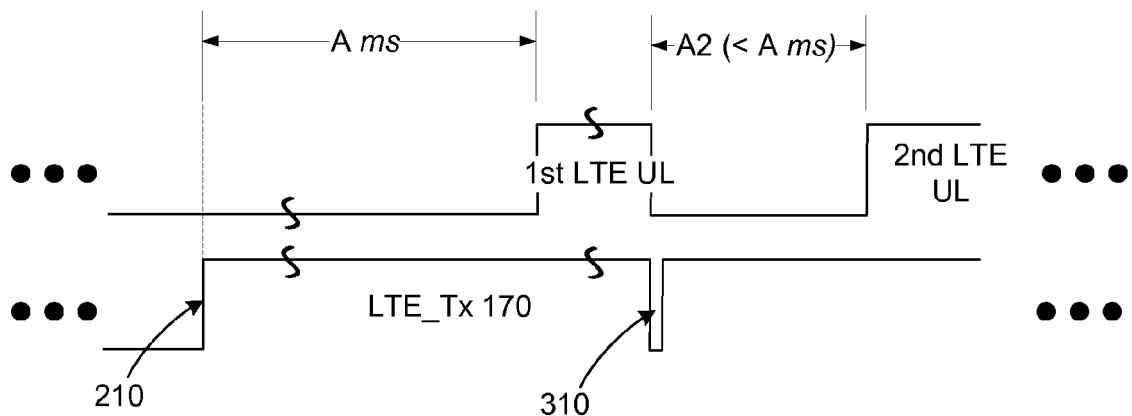

Turning to FIG. 3, other timing aspects of the LTE_Tx 170 signal are illustrated. As illustrated, the LTE_Tx 170 signal comprises an exception pulse 310 of short (e.g., 10 μs) logic-low duration. According to one embodiment, the exception pulse 310 signifies the conclusion of a first LTE UL, with a second LTE UL scheduled to occur "A2" ms from the conclusion of the first LTE UL. Here, the period of time "A2" is less than "A". Thus, the exception pulse 310 indicates to the WLAN/BT 140 that a period of time, although less than the time period "A", is available for communications. For example, the period of time may be sufficient for the WLAN/BT 140 to receive a beacon from the access point 110, such as an ATIM beacon, and transmit an acknowledgement. This time may be sufficient to maintain association with the access point 110 and prevent rate fallback or disassociation. In certain cases, the WLAN/BT 140 can communicate data during a time period indicated by the exception pulse 310. It is noted that, according to certain protocol considerations and limitations, the WLAN/BT 140 may be able to make use of time periods as short as 500 μs or shorter. Also, in certain embodiments, the timings of the LTE_TX 170 signal specify that the LTE 150 generates the exception pulse 310 only when the second LTE UL is scheduled a certain minimum time period after conclusion of the first LTE UL. As such, the period "A2" may comprise a minimum time period such as 1 or 1.2 ms, for example.

Figure 4:
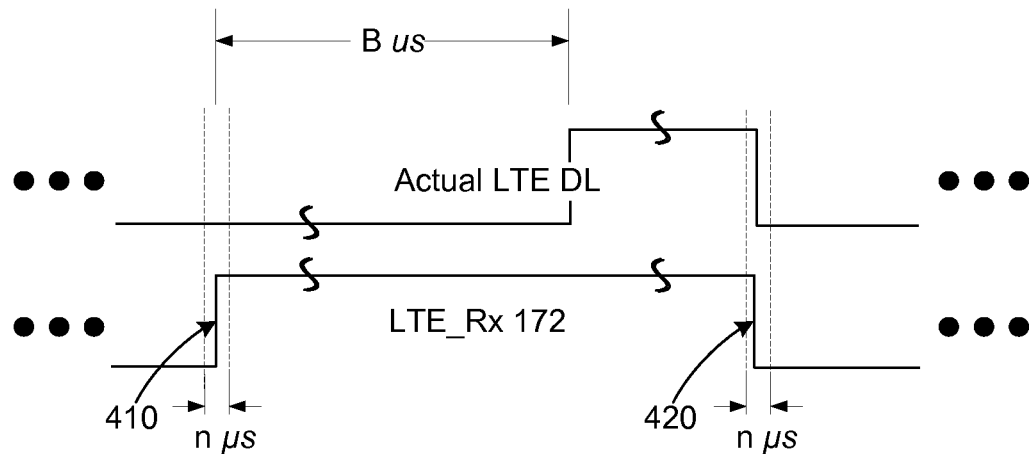

Turning to FIG. 4, timing aspects of the LTE_Rx 172 signal are illustrated. At edge 410, the LTE_Rx 172 signal transitions from a low to high logic level. According to one embodiment, the transition from the low to high logic level is specified to occur "B" μs before a scheduled DL (i.e., reception) by the LTE 150. In one embodiment, the period "B" is specified as 200 μs, although other periods are within the scope of the embodiments described herein. As illustrated, the actual LTE DL begins at some time at or after the period "B," and the LTE_Rx 172 signal remains at the logic high level until the edge 420, when the actual LTE DL concludes. Again, according to certain aspects of the coexistence signaling scheme, a time period of "n" μs is attributed or expected for jitter between edges.

As discussed above, the WLAN/BT 140 is configured to reduce the power of transmissions (or suspend transmissions) to the access point 110 by "B" μs after the edge 410. In this manner, the WLAN/BT 140 can prevent or reduce intermodulation products, for example, from falling on a receiver of the LTE 150. Assertion of the LTE_Rx 172 signal by the LTE 150 may be based in part upon a coexistence matrix that identifies when certain intermodulation conditions are met between the WLAN/BT 140 and the LTE 150.

According to certain embodiments, the LTE_Rx 172 signal shall remain at a logic high state if an LTE DL is scheduled in consecutive subframes or frames. In other aspects, the LTE_Rx 172 signal shall be asserted by the LTE 150 only if it must protect certain LTE channels, such as the physical downlink control channel ("PDCCH") or physical downlink shared channel ("PDCCH"), over an entire LTE DL period. For example, the LTE_Rx 172 signal may be asserted by the LTE 150 to protect the PDCCH channel until the LTE 150 determines that there is no data allocated for DL in a current subframe.

Figure 5:
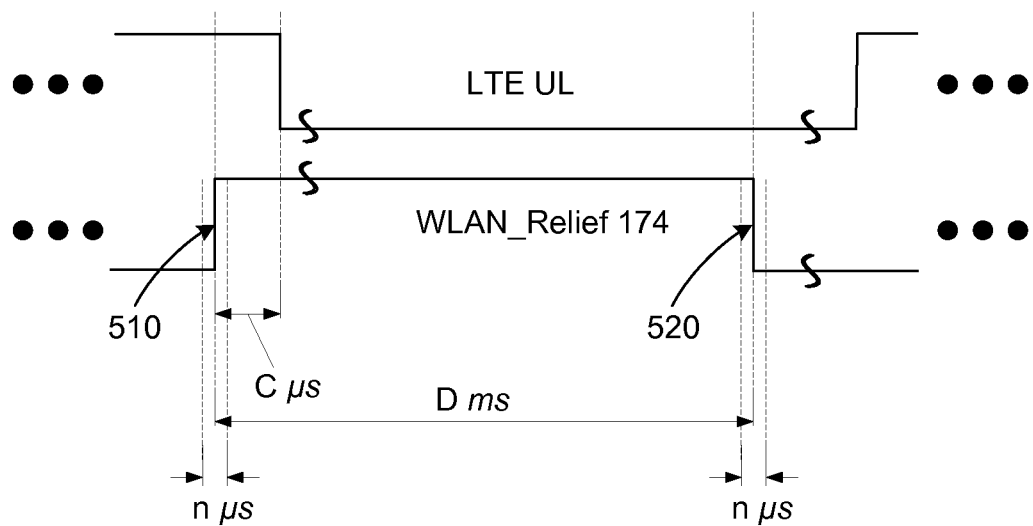

Turning to FIG. 5, timing aspects of the WLAN_Relief 174 signal are illustrated. At edge 510, the WLAN_Relief 174 signal transitions from a low to high logic level. In response to the WLAN_Relief 174 signal, the LTE 150 is configured to conclude any LTE UL communications within "C" μs of the edge 510. In one embodiment, the period "C" is specified as 10 μs, although other periods are within the scope of the embodiments described herein. According to other timing aspects, the logic high level of the WLAN_Relief 174 signal may continue for, at most, "D" ms, until edge 520. The period "D" may be specified based on a length of one or more WLAN packets, for example. In one embodiment, the period "D" is specified as 1.2 ms, although other periods are within the scope of the embodiments described herein. Again, according to certain aspects of the coexistence signaling scheme, a time period of "n" μs is attributed or expected for jitter between edges.

In certain embodiments, it is optional for the LTE 150 to adhere to the timing requirements specified by the WLAN_Relief 174 signal. That is, the LTE 150 may not conclude or cease LTE UL communications within "C" μs of the edge 510, depending upon operating conditions and priorities of the LTE 150. For example, depending upon an amount of data stored in the data queue 158, the LTE 150 may continue to transmit data without adhering to the timing requirements specified by the WLAN_Relief 174 signal.

As described above, the WLAN/BT 140 may assert the WLAN_Relief 174 signal to indicate a distress condition to the LTE 150. It may be necessary for the LTE 150 to conclude UL communications to prevent rate fallback adaptation by the access point 110 or one of the layers 142 or 146 of the WLAN/BT 140. In other cases, it may be necessary for the LTE 150 to conclude UL communications so that the WLAN/BT 140 can receive beacons and prevent disassociation between the access point 110 and the WLAN/BT 140.

Figure 6:
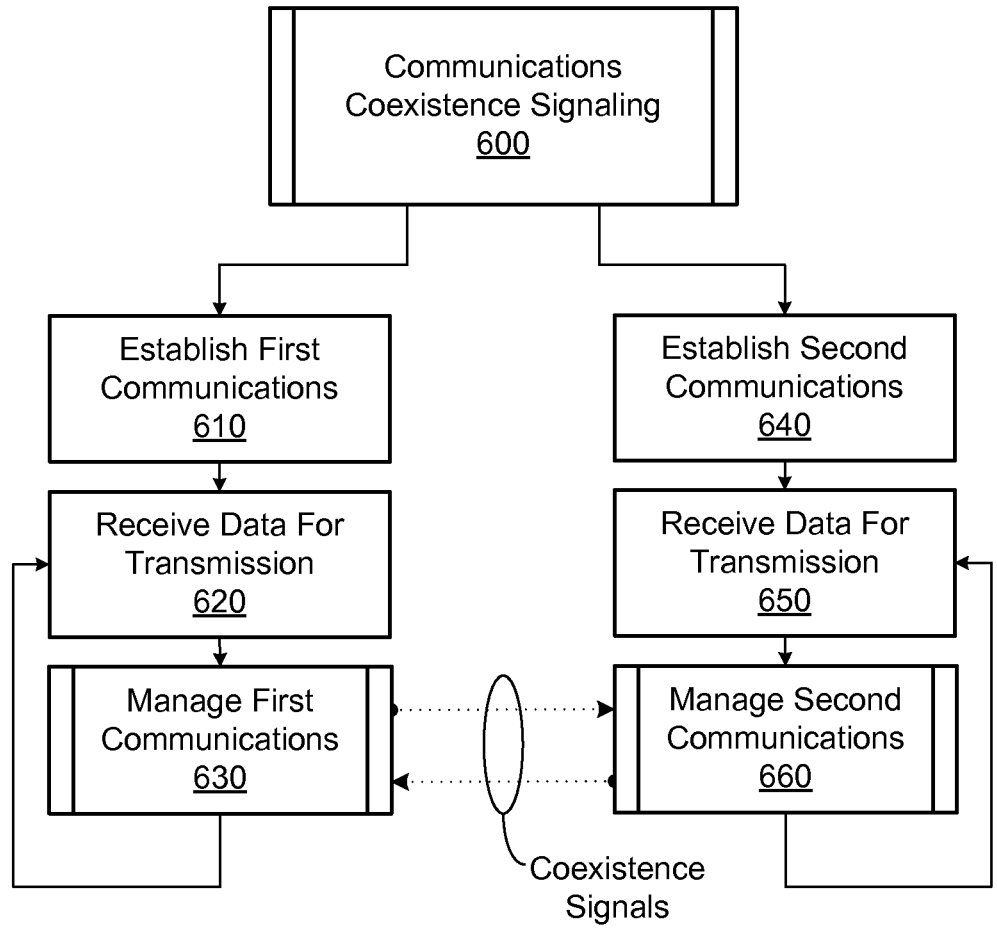
FIG. 6 illustrates a process flow diagram for communications coexistence according to an example embodiment.
Figure 7:
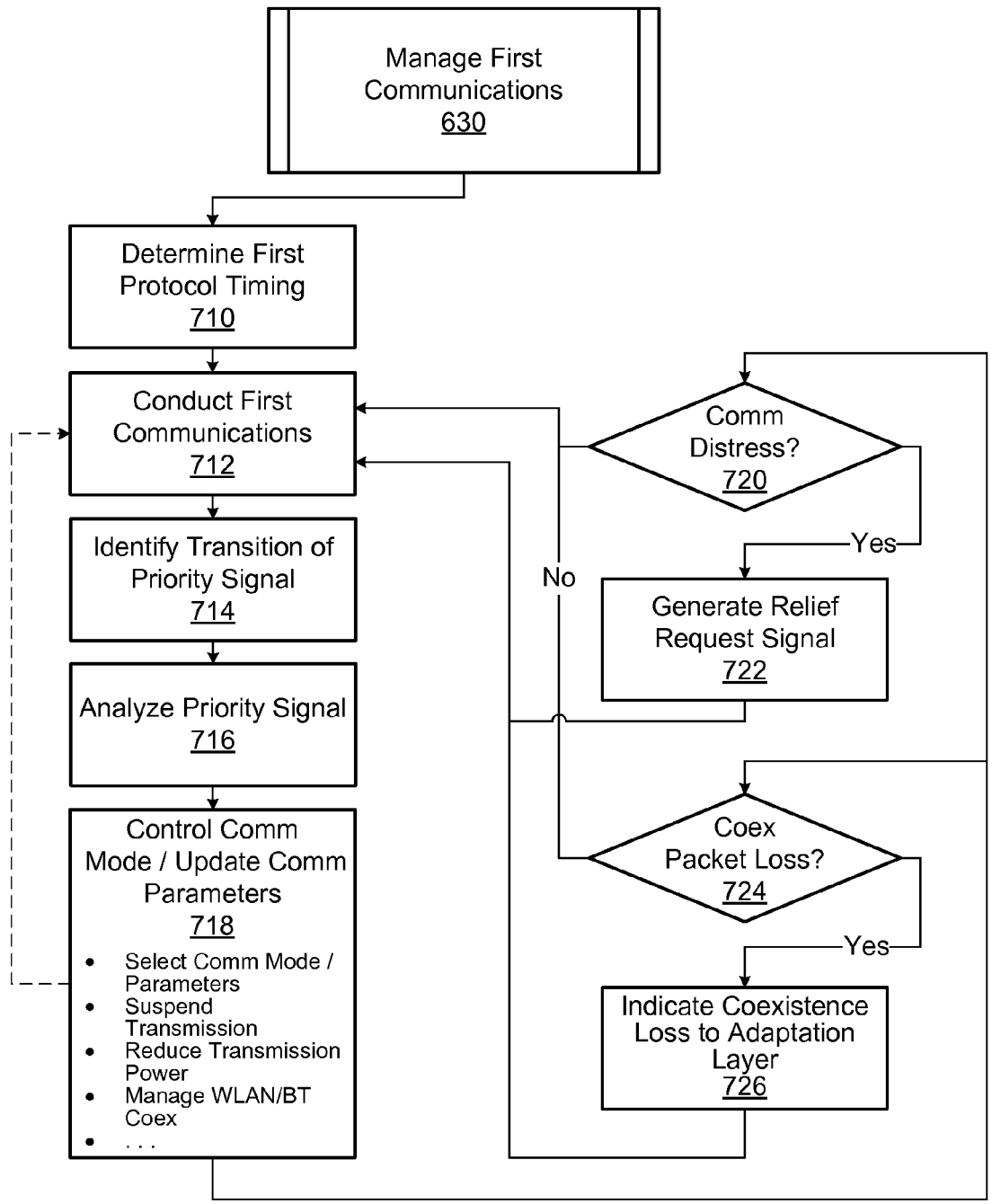
FIG. 7 illustrates a process flow diagram of managing first communications in the communications coexistence process of FIG. 6, according to an example embodiment.
Figure 8:
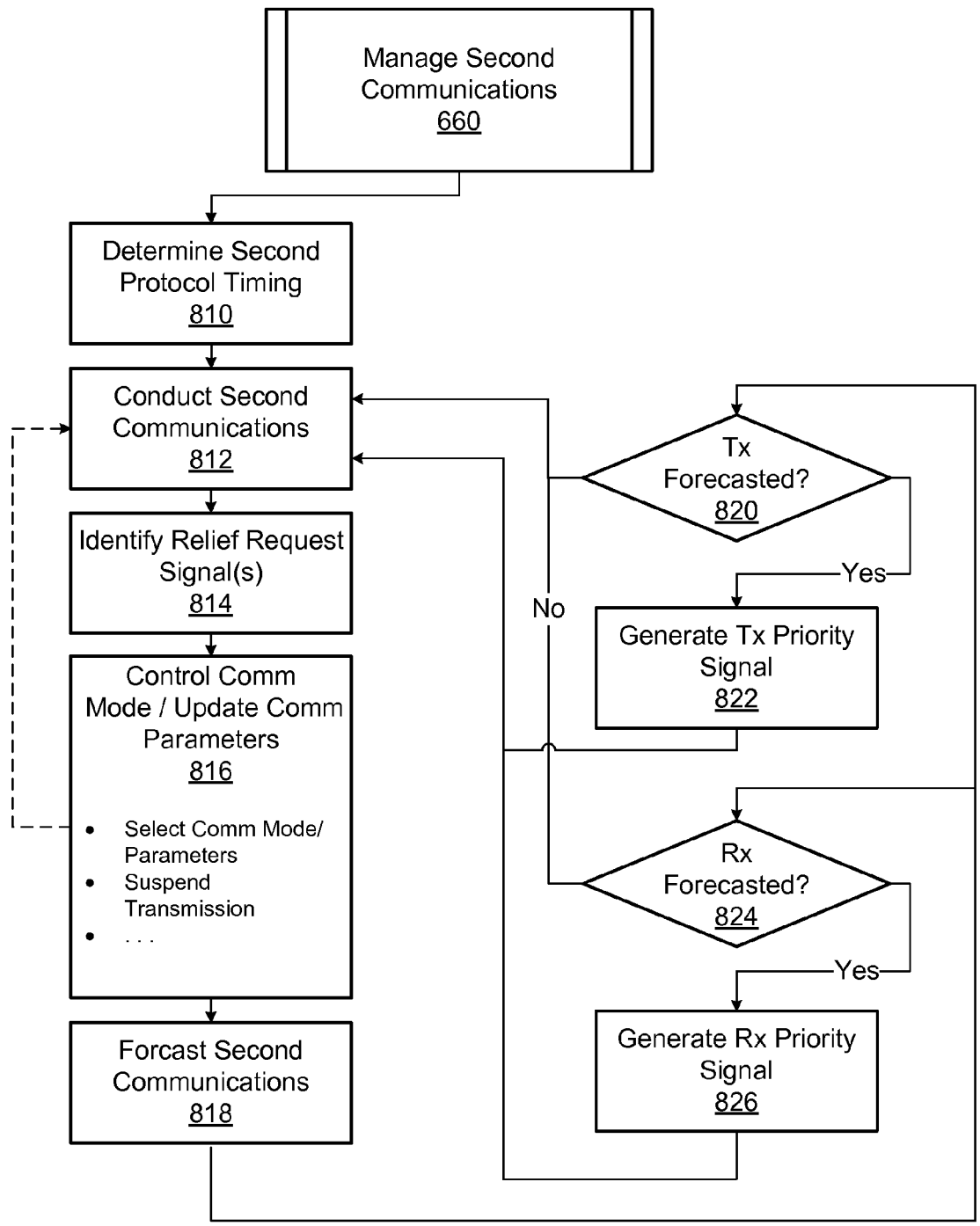
FIG. 8 illustrates a process flow diagram of managing second communications in the communications coexistence process of FIG. 6, according to an example embodiment.

Before turning to the process flow diagrams of FIGS. 6-8, it is noted that the embodiments described herein may be practiced using an alternative order of the steps illustrated in FIGS. 6-8. That is, the process flows illustrated in FIGS. 6-8 are provided as examples only, and the embodiments may be practiced using process flows that differ from those illustrated. Additionally, it is noted that not all steps are required in every embodiment. In other words, one or more of the steps may be omitted or replaced, without departing from the spirit and scope of the embodiments. Further, steps may be performed in different orders, in parallel with one another, or omitted entirely, and/or certain additional steps may be performed without departing from the scope and spirit of the embodiments.

FIG. 6 illustrates a process flow diagram for communications coexistence according to an example embodiment. While the process below is described in connection with the elements of the system 10 of FIG. 1, the process may be implemented by other system elements.

As illustrated, the process 600 comprises a first communications process including 610, 620, and 630, and a second communications processing including 640, 650, and 660. In one embodiment, the first communications process comprises a BT, WLAN, or combination WLAN/BT communications process, and the second communications process comprises a cellular LTE communications process. In should be appreciated, however, that the process 600 may apply to other combinations of communications standards.

At 610, first communications are established, for example, between the WLAN/BT 140 and one or both of the access points 110 and 112 of FIG. 1. That is, association may be achieved between the WLAN/BT 140 and one or both of the access points 110 and 112 at 610. At 620, the WLAN/BT 140 receives data for transmission from the host controller 160. The data for transmission may be generated by one or more of the host OS 162 or the host applications 164, for example. At 630, the WLAN/BT 140 manages the first communications with one or both of the access points 110 and 112. According to the features and aspects described above, while managing the first communications at 630, the WLAN/BT 140 operates according to various signals of a coexistence signaling scheme.

At 640, second communications are established, for example, between the LTE 150 and the base station 120 of FIG. 1. At 650, the LTE 150 receives data for transmission from the host controller 160. The data for transmission may be generated by one or more of the host OS 162 or the host applications 164, for example. At 660, the LTE 150 manages the second communications with the base station 120. According to the features and aspects described above, while managing the first communications at 660, the LTE 150 operates according to various signals of the coexistence signaling scheme.

FIG. 7 illustrates a process flow diagram of the managing first communications 630 of FIG. 6, according to an example embodiment. At 710, a first protocol timing is determined by the WLAN/BT 140. That is, the WLAN/BT 140 determines and settles on a schedule of communications for transmitting the data received at 620 of FIG. 6 to one or more of the access points 110 and 112 of FIG. 1. The first protocol timing may be determined in connection with conditions and requirements evaluated by the layers 142 and 146 of the WLAN/BT 140, for example, which may include session management and flow control.

At 712, the WLAN/BT 140 conducts communications with one or more of the access points 110 and 112 according to the first protocol timing determined at 710. In general, communications continue at 712 until certain events occur based on the logic levels of the coexistence signals, for example, or another changed circumstance. At 714, the WLAN/BT 140 identifies a transition of one or more of the coexistence signals, such as the LTE_Tx 170 or LTE_Rx 172 signals.

At 716, the WLAN/BT 140 analyzes one or more of the LTE_Tx 170 and LTE_Rx 172 signals to determine logic levels of the signals, for example. According to certain aspects, the WLAN/BT 140 analyzes patterns of the LTE_Tx 170 and LTE_Rx 172 signals to ascertain operating parameters and modes of the LTE 150. If the WLAN/BT 140 determines that the LTE_Tx 170 signal is typically asserted by the LTE 150 in a certain pattern, for a certain period of time, or for a certain average period of time, the WLAN/BT 140 may update one or more parameters of communication with the access points 110 and 112 at reference 718, based on the determination. As one example, if the WLAN/BT 140 determines that the LTE_Tx 170 signal is typically asserted for periods of time less than 2 ms, the WLAN/BT 140 may update one or more parameters to communicate using CTS_to_Self announcements. Otherwise, if the WLAN/BT 140 determines that the LTE_Tx 170 signal is typically asserted for periods of time greater than 2 ms, the WLAN/BT 140 may update substantially rely upon the WLAN power management mode for scheduling.

As suggested above, at 718, the WLAN/BT 140 updates one or more parameters of the first communications and controls the first communications, according to various considerations including an amount of data to be transmitted, the first protocol timings, the identification of a transition on one or more of the coexistence signals at 714, and the analysis at 716. As outlined above in connection with the signal timing diagrams of FIGS. 2-4, the WLAN/BT 140 may suspend the first communications based on the LTE_Tx 170 signal, reduce a WLAN transmission power based on the LTE_Rx 172 signal, communicate in connection with a CTS-to-Self announcement, and/or indicate that it is entering a power management sleep mode. In exemplary embodiments, the control of the first communications is performed by the WLAN/BT 140 at 718 substantially in accordance with the timing specifications outlined in FIGS. 2-4.

Further, at 718, aspects of the first communications may be updated in connection with conditions and requirements evaluated by the layers 142 and 146 of the WLAN/BT 140, based on the identification of a transition on one or more of the coexistence signals at 714 and the analysis at 716. For example, an alternate WLAN communications channel or communications rate may be selected based on the identification of a transition on one or more of the coexistence signals at 714 and the analysis at 716. Additionally, the WLAN/BT 140 may manage the coexistence of both BT and WLAN communications, according to an internal WLAN/BT coexistence protocol. Parameters and timings among the BT and WLAN communications may also be updated at 718 based on the identification of a transition on one or more of the coexistence signals at 714 and the analysis at 716.

Continuing from 718, the process 630 includes determining whether WLAN/BT communications are in distress at 720. For example, if transmissions by the LTE 150 have been active with a high duty cycle for a significant period of time and WLAN throughput over this time period has been low, either the WLAN/BT 140 or the access point 110 may have required automatic rate fallback pursuant to the perception of a poor communications link. In this case, the WLAN/BT 140 may identify a distress condition at 720 and generate a logic high level on the WLAN_Relief 174 signal at 722. The logic high level on the WLAN_Relief 174 signal is coupled to the LTE 150 as described herein. It is noted that the WLAN/BT 140 may identify a distress condition at 720 for reasons other than rate fallback, such as to avoid disassociation or prevent packet loss.

Also continuing from 718, the process 630 includes determining whether "coexistence" packet loss has occurred at 724. For example, if packet loss occurs due to the suspension of communications by the WLAN/BT 140 in response to the LTE_Tx 170 signal, the coexistence layer 144 of the WLAN/BT 140 may indicate to one or both of the layers 142 and 146 that the packet loss is a "coexistence" packet loss at reference 726. In other words, the layers 142 and 146 may distinguish packets lost due to the coexistence signaling scheme as being different than packets lost due to generally poor channel conditions. This distinction may result in alternate session management and flow control by the layers 142 and 146 depending upon the type of packet loss.

Turning to FIG. 8, a process flow diagram of the managing second communications 660 of FIG. 6 is illustrated, according to an example embodiment. At 810, a second protocol timing is determined by the LTE 150. That is, the LTE 150 determines and settles on a schedule of communications for transmitting the data received at 650 of FIG. 6 to the base station 120 of FIG. 1. The second protocol timing may be determined in connection with conditions and requirements evaluated by the layers 152 and 156 of the LTE 150, for example, which may include session management and flow control.

At 812, the LTE 150 conducts communications with the base station 120 according to the second protocol timing determined at 712. In general, communications continue at 812 until certain events occur based on the logic levels of the coexistence signals, for example, or another changed circumstance. At 814, the LTE 150 identifies a transition of one or more of the coexistence signals, such as the WLAN_Relief 174 signal.

At 816, the LTE 150 updates one or more parameters of the second communications and controls the second communications, according to various considerations including an amount of data to be transmitted, the second protocol timings, and the identification of a transition on the WLAN_Relief 174 signal at 814. As outlined above, the LTE 150 may suspend the second communications based on the WLAN_Relief 174 signal, in accordance with the timing specification outlined in FIG. 5, or update other communications parameters. Further, at 816, parameters of the second communications may be updated in connection with conditions and requirements evaluated by the layers 152 and 156 of the LTE 150, based on the identification of a transition on the WLAN_Relief 174 signal. For example, an alternate LTE communications channel, protocol timing, or reduced transmission power may be selected by the LTE 150 based on the identification of a transition on the WLAN_Relief 174 signal.

Continuing from 816, the process 660 includes forecasting the second communications at 818. For example, LTE UL and DL timings may be forecast based on the second protocol timing determined at 810. This "look-ahead" is achieved by the LTE 150 based on a determined schedule of Tx and Rx timings negotiated between the LTE 150 and the base station 120.

At 820, the LTE 150 determines if a transmission is forecasted. If so, the LTE 150 generates a logic high level on the LTE_Tx 170 signal at 822. Further, at 824, the LTE 150 determines if a reception is forecasted. If so, the LTE 150 generates a logic high level on the LTE_Rx 172 signal at 826. The logic levels on the LTE_Tx 170 and the LTE_Rx 172 signals are coupled to the WLAN/BT 140 as described herein. It is noted that, in exemplary embodiments, the generation of a logic high level on the LTE_Tx 170 signal and/or the LTE_Rx 172 signal is conditioned upon factors in addition to the forecast determined at 818. For example, the generation of a logic high level on the LTE_Tx 170 signal and/or the LTE_Rx 172 signal may also be conditioned upon overlapping channel or intermodulation conditions, as described below.

Figure 9:
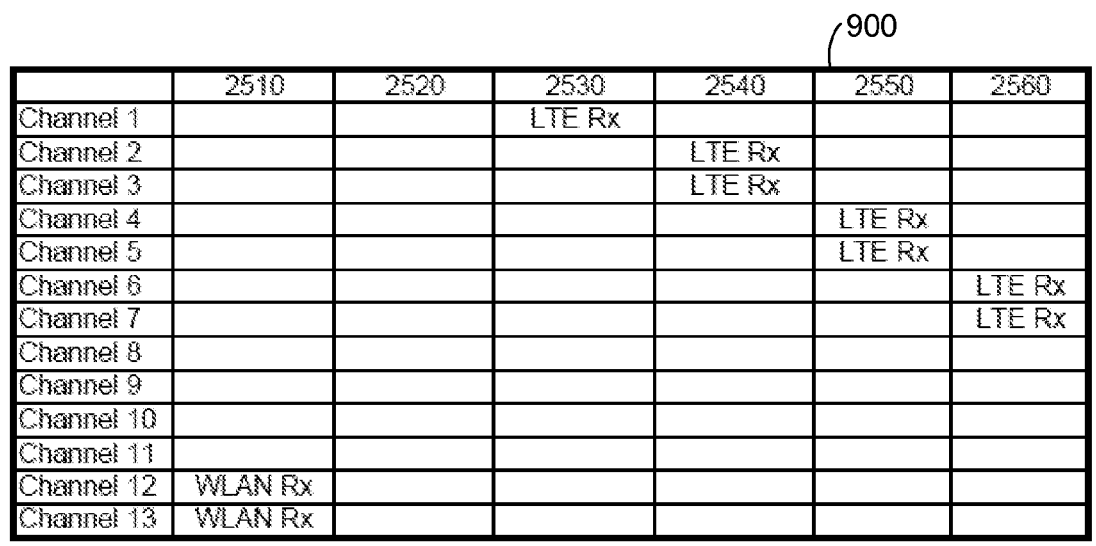
FIG. 9 illustrates an example embodiment of a coexistence matrix.

FIG. 9 illustrates an example embodiment of a coexistence matrix 900. As one aspect of the embodiments described herein, a coexistence matrix may be generated and stored in one or more of the WLAN/BT 140, the LTE 150, or the host controller 160. The coexistence matrix generally identifies when certain intermodulation conditions exist between the WLAN/BT 140 and the LTE 150. For example, the intermodulation conditions may depend upon which LTE channel is being relied upon by the WLAN/BT 140 (e.g., WLAN channel 6 vs. 11) and the LTE 150 (e.g., LTE band 7 vs. band 38). It is noted that the coexistence matrix 900 may be generated by any or each of the WLAN/BT 140, the LTE 150, and the host controller 160 and stored, in any data format, by any or each of the WLAN/BT 140, the LTE 150, and the host controller 160.

To generate the coexistence matrix 900, overlapping channel (or intermodulation) combinations or conditions between communications by the WLAN/BT 140 and the LTE 150 may be ascertained. In certain cases, those overlapping channel combinations depend, in part, on circuit board parasitics in the device 100 and the tolerances of the circuit elements mounted to the circuit boards. Thus, after manufacture, the device 100 may be tested and characterized to determine or ascertain certain offending combinations or conditions between communications by the WLAN/BT 140 and the LTE 150. In some cases, these offending combinations or conditions may change over time, such as with temperature drift, and the device 100 may update the coexistence matrix 900 periodically based on those changes.

Referring to the coexistence matrix 900, both WLAN and LTE "Rx protect" conditions are specified. For the LTE 2530 Mhz and WLAN Channel 1 combination, the coexistence matrix 900 specifies protection of LTE Rx. Here, generation of the LTE_Rx 172 signal by the LTE 150 may be conditioned (additionally) upon the overlapping channel combination of LTE 2530 Mhz and WLAN Channel 1. Thus, while assertion of the LTE_Rx 172 signal by the LTE 150 is dependent upon a timing of LTE Rx, the assertion may also be dependent upon the overlapping channel combinations indicated in the coexistence matrix 900.

Alternatively, for the LTE 2510 Mhz and WLAN Channel 12 combination, the coexistence matrix 900 specifies protection of WLAN Rx. Here, generation of the LTE_Tx 170 signal by the LTE 150 may be conditioned (additionally) upon the overlapping channel combination of LTE 2510 Mhz and WLAN Channel 12. Thus, while assertion of the LTE_Tx 170 signal by the LTE 150 is dependent upon a timing of LTE Tx, the assertion may also be dependent upon the overlapping channel combinations indicated in the coexistence matrix 900.

Figure 10:
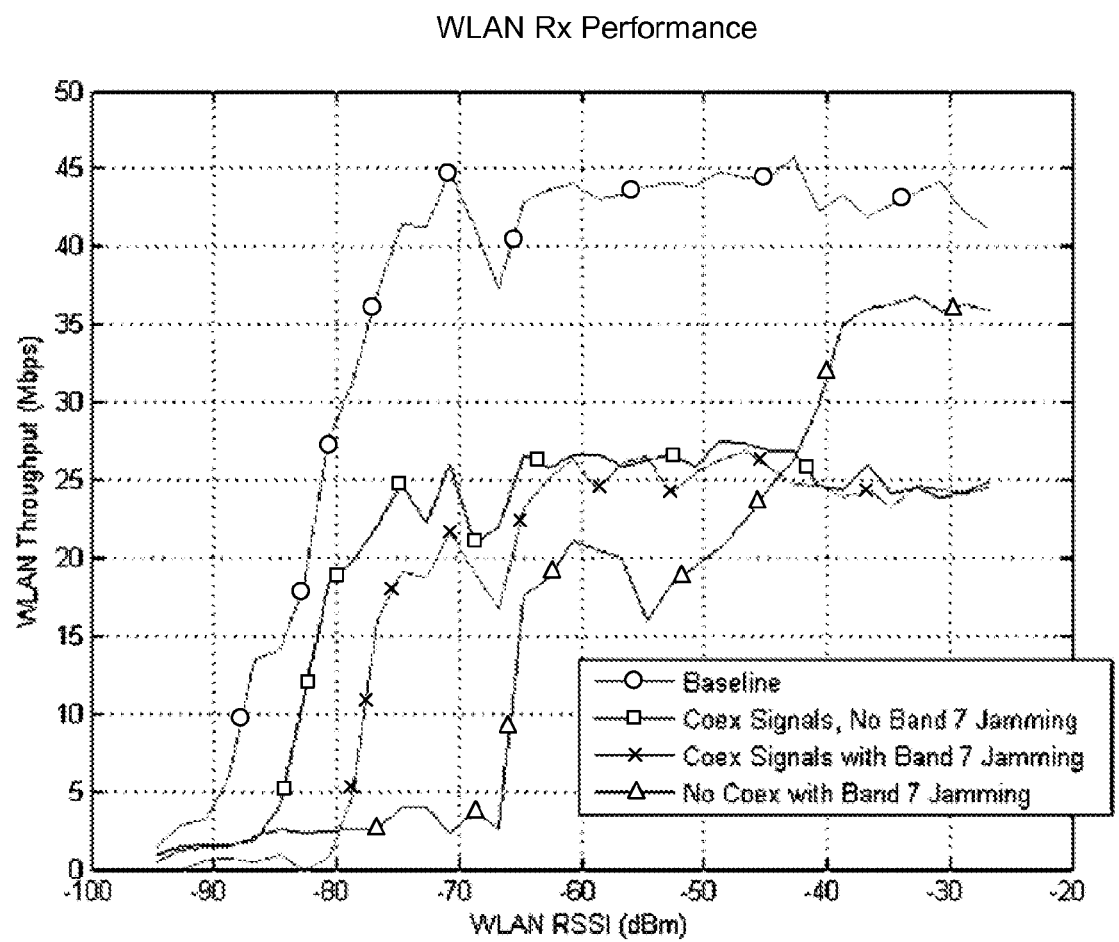
FIG. 10 illustrates a chart representative of example empirical Rx communications performance according to aspects of the embodiments described herein.

FIG. 10 illustrates a chart representative of example empirical Rx communications performance according to aspects of the embodiments described herein. In FIG. 10, a measure of WLAN Rx throughput is illustrated for baseline WLAN Rx communications, for WLAN Rx communications with simulated coexistence signals and without band 7 jamming, for WLAN Rx communications with coexistence signals and band 7 jamming, and for WLAN Rx communications without coexistence signals and with band 7 jamming. As illustrated, the use of coexistence signals with band 7 jamming offers a significant improvement in WLAN Rx throughput as compared to WLAN Rx communications without the use of coexistence signals, especially between the received signal strength range of about −77 to −67 dBm.

Figure 11:
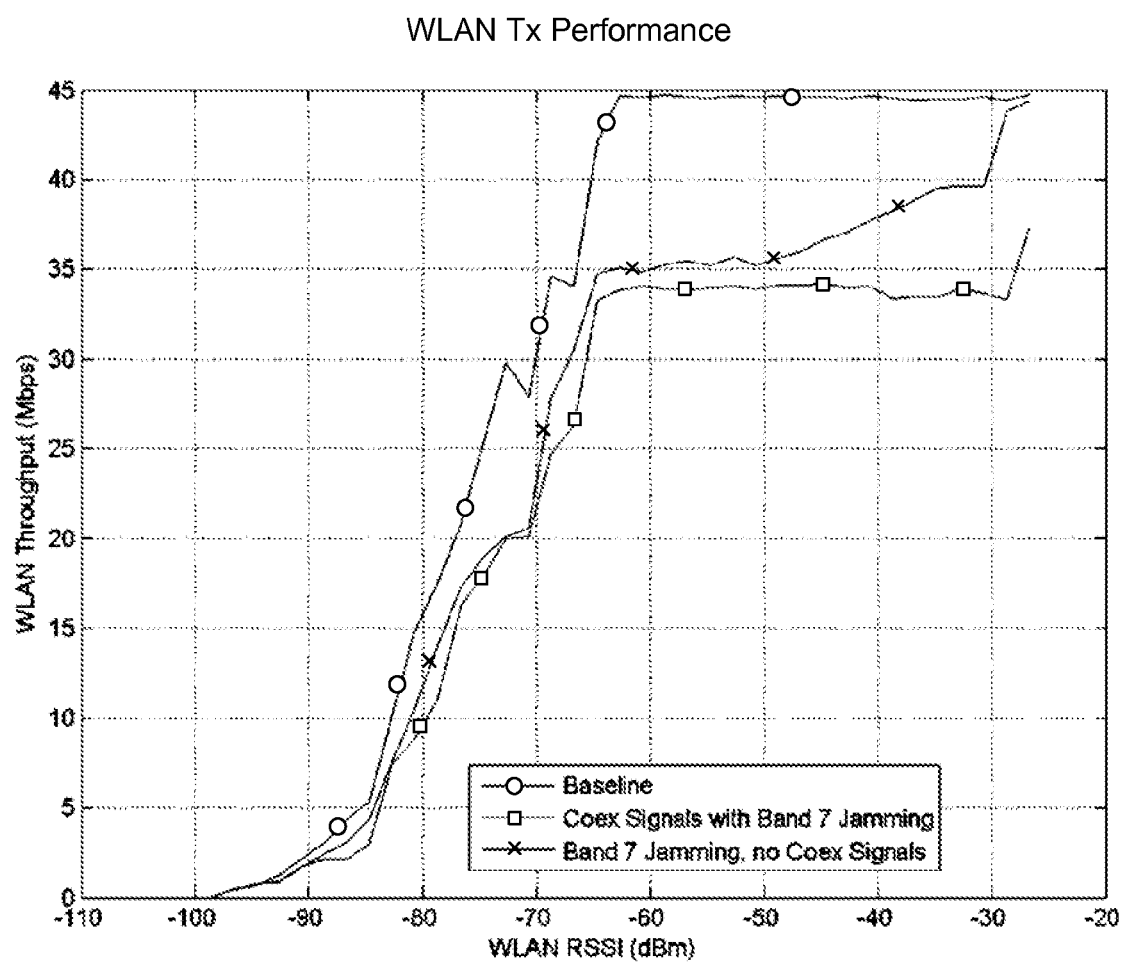
FIG. 11 illustrates a chart representative of example empirical Tx communications performance according to aspects of the embodiments described herein.

FIG. 11 illustrates a chart representative of example empirical Tx communications performance according to aspects of the embodiments described herein. In FIG. 11, a measure of WLAN Tx throughput is illustrated for baseline WLAN Tx communications, for WLAN Tx communications with coexistence signals and band 7 jamming, and for WLAN Tx communications without coexistence signals and with band 7 jamming. As illustrated, the use of coexistence signals with band 7 jamming offers no significant reduction in WLAN Tx throughput as compared to WLAN Tx communications without the use of coexistence signals. It is noted that, because the coexistence signaling scheme generally prefers communication by the cellular standard over the WLAN standard, no appreciable impact to cellular communications is anticipated by the scheme.

Figure 12:
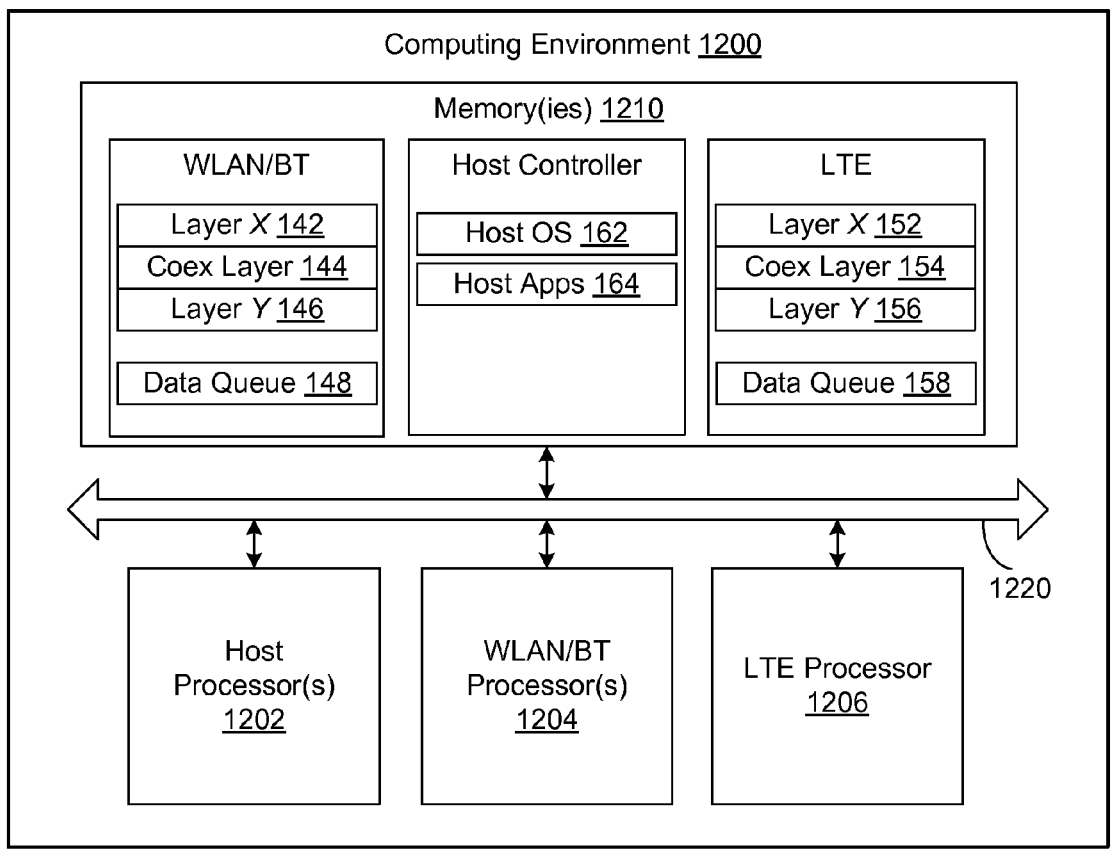
FIG. 12 illustrates an example schematic block diagram of a computing environment that may be employed in the system of FIG. 1 according to various embodiments.

FIG. 12 illustrates an example schematic block diagram of a computing environment 1200 that may be employed in the system of FIG. 1 according to various embodiments. The device 100 of FIG. 1 may be implemented, at least in part, based on the elements of the computing environment 1200. The computing environment 1200 comprises various processing circuits or processors including processors 1202, 1204, and 1206, a memory (or memories) 1210, and a local interface 1220. The local interface 1220 may comprise, for example, a data bus with an accompanying address/control bus or other bus structure as can be appreciated.

The processors 1202, 1204, and 1206 may represent multiple processors and/or multiple processor cores and the memory 1210 may represent multiple memories that operate in parallel processing circuits, respectively or in combination. In one embodiment, the processors 1202, 1204, and 1206 can be implemented as general purpose processors, circuits, state machines, or combinations thereof that employ any one of or a combination of technologies. These technologies may include, but are not limited to, discrete logic circuits having logic gates for implementing various logic functions upon an application of one or more data signals, ASICs having appropriate logic gates, field-programmable gate arrays (FPGAs), or other components, etc. Such technologies are generally well known by those skilled in the art and, consequently, are not described in detail herein.

In various embodiments, the memory 1210 stores data and software or executable-code components executable by the processors 1202, 1204, and 1206. For example, the memory 1210 may store data and software or executable-code components associated with the abstract layers 142, 144, 146, 152, 154, and 156, the data queues 148 and 158, and the host OS 162 and applications 164. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other processor-specific or proprietary programming languages.

As discussed above, the memory 1210 stores software for execution by the processors 1202, 1204, and 1206, along with other data. In this respect, the terms "executable" or "for execution" refer to software forms that can ultimately be run or executed by the processors 1202, 1204, and 1206, whether in source, object, machine, or other form. Any of the processors 1202, 1204, and 1206 may retrieve executable code stored in the memory 1212 and, based on the execution of that code, be directed to implement any one or more of the processes described above in connection with FIGS. 6-8, for example.

In various embodiments, the memory 1210 may include both volatile and nonvolatile memory and data storage components. Volatile components are those that do not retain data values upon loss of power. Nonvolatile components are those that retain data upon a loss of power. Thus, the memory 1210 may comprise, for example, a random access memory (RAM), read-only memory (ROM), magnetic or other hard disk drive, solid-state, semiconductor, or similar drive, USB flash drive, memory card, floppy disk, optical disc, magnetic tape, and/or other memory component, or any combination thereof. In addition, the RAM may comprise, for example, a static random access memory (SRAM), dynamic random access memory (DRAM), or magnetic random access memory (MRAM), and/or other similar memory device. The ROM may comprise, for example, a programmable read-only memory (PROM), erasable programmable read-only memory (EPROM), electrically erasable programmable read-only memory (EEPROM), or other similar memory device.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Therefore, at least the following is claimed:

1. A method for communications coexistence signaling, comprising:
   establishing, by at least one communications circuit, first communications with an access point using a first communications specification;
   establishing, by the at least one communications circuit, second communications with a base station using a second communications specification;
   determining a first protocol timing of the first communications specification and a second protocol timing of the second communications specification;
   generating, by the at least one communications circuit, a priority signal based on the second protocol timing, the priority signal comprising a transmit priority signal and a receive priority signal; and
   managing the first communications with the access point based at least on the transmit and receive priority signals.

2. The method of claim 1, further comprising:
   analyzing a timing pattern of the transmit priority signal; and
   managing the first communications with the access point based on the timing pattern.

3. The method of claim 2, wherein:
   analyzing the timing pattern comprises analyzing a duration of the transmit priority signal, and
   managing the first communications comprises selecting between alternative modes of communication with the access point based on the duration.

4. The method of claim 1, further comprising generating a relief request signal based on the first protocol timing and a status of the first communications with the access point.

5. The method of claim 4, wherein the status of the first communications with the access point comprises at least one of an amount of data in a data queue, a fallback mode of the first communications with the access point, and a likelihood of packet loss or disassociation with the access point.

6. The method of claim 1, wherein:
   generating the priority signal further comprises generating the transmit priority signal at a first predetermined time before a transmission using the second communications specification, and generating the receive priority signal at a second predetermined time before a reception using the second communications specification.

7. The method of claim 6, wherein generating the transmit priority signal further comprises generating a transmit exception pulse when the transmission using the second communications specification includes a recess for a time less than the predetermined time.

8. The method of claim 1, wherein the method further comprises:
based on the transmit priority signal, suspending the first communications with the access point; and
based on the receive priority signal, reducing a transmit power of the first communications with the access point.

9. The method of claim 8, further comprising, when suspending the first communications based on the transmit priority signal, indicating any packet loss to a rate adaptation layer.

10. The method of claim 1, further comprising:
ascertaining overlapping channel combinations or conditions between the first and second communications, wherein
generating the priority signal further comprises generating the priority signal based on the overlapping channel combinations or conditions.

11. The method of claim 10, wherein ascertaining the overlapping channel further comprises generating a coexistence matrix that identifies overlapping channel combinations or conditions between the first and second communications.

12. An apparatus for communications coexistence, comprising:
a wireless communications front end; and
at least one communications circuit configured to:
establish first communications with an access point using a first communications specification,
establish second communications with a base station using a second communications specification,
determine a protocol timing of the second communications specification,
generate a priority signal based on the protocol timing; and
generate a relief request signal based on a status of the first communications with the access point.

13. The apparatus of claim 12, wherein:
the priority signal comprises a transmit priority signal and a receive priority signal, and
the least one communications circuit is further configured to manage the first communications with the access point based on the transmit and receive priority signals.

14. The apparatus of claim 12, wherein the least one communications circuit is further configured to manage the second communications with the base station based at least in part on the relief request signal.

15. The apparatus of claim 12, wherein the status of the first communications with the access point comprises at least one of an amount of data in a data queue, a fallback mode of the first communications with the access point, and a likelihood of packet loss or disassociation with the access point.

16. A method for communications, comprising:
establishing, by at least one communications circuit, communications with an access point according to a first protocol timing;
identifying a priority signal, the priority signal being generated based on a second protocol timing;
analyzing a timing pattern of the priority signal; and
managing the communications with the access point based on the timing pattern of the priority signal, the managing comprising selecting between alternative modes of communication with the access point based on the timing pattern.

17. The method of claim 16, further comprising:
generating a relief request signal based on the first protocol timing and a status of the communications with the access point, wherein
the status of the communications with the access point comprises at least one of an amount of data in a data queue, a fallback mode of the communications with the access point, and a likelihood of packet loss or disassociation with the access point.

18. The apparatus of claim 13, wherein the at least one communications circuit is configured to:
based on the transmit priority signal, suspend the first communications with the access point; and
based on the receive priority signal, reduce a transmit power of the first communications with the access point.

19. The apparatus of claim 18, wherein the at least one communications circuit is configured to:
when suspending the first communications based on the transmit priority signal, indicate any packet loss to a rate adaptation layer.

20. The apparatus of claim 13, wherein the at least one communications circuit is configured to:
generate the transmit priority signal at a first predetermined time before a transmission using the second communications specification; and
generate the receive priority signal at a second predetermined time before a reception using the second communications specification.

* * * * *